United States Patent [19]
Arimilli et al.

[11] Patent Number: 6,018,791
[45] Date of Patent: Jan. 25, 2000

[54] APPARATUS AND METHOD OF MAINTAINING CACHE COHERENCY IN A MULTI-PROCESSOR COMPUTER SYSTEM WITH GLOBAL AND LOCAL RECENTLY READ STATES

[75] Inventors: Ravi Kumar Arimilli, Austin; John Steven Dodson, Pflugerville; Jerry Don Lewis, Round Rock, all of Tex.

[73] Assignee: International Business Machines Corporation, Armonk, N.Y.

[21] Appl. No.: 09/024,307

[22] Filed: Feb. 17, 1998

Related U.S. Application Data

[63] Continuation-in-part of application No. 08/839,557, Apr. 14, 1997, abandoned.

[51] Int. Cl.[7] .............................. G06F 12/00; G06F 13/00
[52] U.S. Cl. ............................ 711/141; 711/3; 711/118; 711/123; 711/144; 711/146; 711/154; 711/155; 711/210
[58] Field of Search ................................ 711/3, 118, 123, 711/125, 126, 141, 144, 146, 154, 155, 210

[56] References Cited

U.S. PATENT DOCUMENTS

| | | |
|---|---|---|
| 4,141,067 | 2/1979 | McLagan ............................... 711/141 |
| 4,695,951 | 9/1987 | Hooker et al. ........................... 711/141 |
| 5,317,716 | 5/1994 | Liu .......................................... 711/141 |
| 5,671,391 | 9/1997 | Knott ...................................... 711/154 |
| 5,781,757 | 7/1998 | Deshpande .............................. 711/141 |
| 5,829,040 | 10/1998 | Son ........................................ 711/146 |
| 5,832,534 | 11/1998 | Singh et al. ............................. 711/141 |
| 5,845,327 | 12/1998 | Rickard et al. ......................... 711/146 |

*Primary Examiner*—Tuan V. Thai
*Attorney, Agent, or Firm*—Volel Emile; Jack V. Musgrove; Andrew J. Dillon

[57] ABSTRACT

A multi-processor computer system with clustered processing units uses a cache coherency protocol having a "recent" coherency state to indicate that a particular cache block containing a valid copy of a value (instruction or data) was the most recently accessed block out of a group of cache blocks in different caches (but at the same cache level) that share valid copies of the value. The "recent" state can advantageously be used to implement optimized memory operations such as intervention, by sourcing the value from the cache block in the "recent" state, as opposed to sourcing the value from system memory (RAM), which would be a slower operation. In an exemplary implementation, the hierarchy has two cache levels supporting a given processing unit cluster; the "recent" state can be applied to a plurality of caches at the first level (each associated with a different processing unit cluster), and the "recent" state can further be applied to one of the caches at the second level.

6 Claims, 3 Drawing Sheets

APPARATUS AND METHOD OF MAINTAINING CACHE COHERENCY IN A MULTI-PROCESSOR COMPUTER SYSTEM WITH GLOBAL AND LOCAL RECENTLY READ STATES

CROSS-REFERENCE TO RELATED APPLICATION

This application is a continuation-in-part of U.S. patent application Ser. No. 08/839,557 filed Apr. 14, 1997, now abandoned.

BACKGROUND OF THE INVENTION

1. Field of the Invention

The present invention generally relates to computer systems and, more particularly, to a cache-coherency protocol which provides for a most recently referenced state allowing improvements in cache intervention of data.

2. Description of the Related Art

The basic structure of a conventional multi-processor computer system 10 is shown in FIG. 1. Computer system 10 has several processing units, two of which, 12a and 12b, are depicted, which are connected to various peripheral devices, including input/output (I/O) devices 14 (such as a display monitor, keyboard, graphical pointer (mouse), and a permanent storage device (hard disk)), memory device 16 (such as random-access memory or RAM) that is used by the processing units to carry out program instructions, and firmware 18 whose primary purpose is to seek out and load an operating system from one of the peripherals (usually the permanent memory device) whenever the computer is first turned on. Processing units 12a and 12b communicate with the peripheral devices by various means, including a generalized interconnect or bus 20, or direct-memory-access channels (not shown). Computer system 10 may have many additional components which are not shown, such as serial and parallel ports for connection to, e.g., modems or printers. Those skilled in the art will further appreciate that there are other components that might be used in conjunction with those shown in the block diagram of FIG. 1; for example, a display adapter might be used to control a video display monitor, a memory controller can be used to access memory 16, etc. The computer can also have more than two processing units.

In a symmetric multi-processor (SMP) computer, all of the processing units are generally identical; that is, they all use a common set or subset of instructions and protocols to operate and generally have the same architecture. A typical architecture is shown in FIG. 1. A processing unit includes a processor core 22 having a plurality of registers and execution units, which carry out program instructions in order to operate the computer. An exemplary processing unit includes the PowerPC™ processor marketed by International Business Machines Corporation. The processing unit can also have one or more caches, such as an instruction cache 24 and a data cache 26, which are implemented using high-speed memory devices. Caches are commonly used to temporarily store values that might be repeatedly accessed by a processor, in order to speed up processing by avoiding the longer step of loading the values from memory 16. These caches are referred to as "on-board" when they are integrally packaged with the processor core on a single integrated chip 28. Each cache is associated with a cache controller (not shown) that manages the transfer of data between the processor core and the cache memory.

A processing unit can include additional caches, such as cache 30, which is referred to as a level 2 (L2) cache since it supports the on-board (level 1) caches 24 and 26. In other words, cache 30 acts as an intermediary between memory 16 and the on-board caches, and can store a much larger amount of information (instructions and data) than the on-board caches can, but at a longer access penalty. For example, cache 30 may be a chip having a storage capacity of 256 or 512 kilobytes, while the processor may be an IBM PowerPC™ 604-series processor having on-board caches with 64 kilobytes of total storage. Cache 30 is connected to bus 20, and all loading of information from memory 16 into processor core 22 must come through cache 30. Although FIG. 1 depicts only a two-level cache hierarchy, multi-level cache hierarchies can be provided where there are many levels (L3, L4, etc.) of serially connected caches.

In an SMP computer, it is important to provide a coherent memory system, that is, to cause writes to each individual memory location to be serialized in some order for all processors. For example, assume a location in memory is modified by a sequence of write operations to take on the values: 1, 2, 3, 4. In a cache-coherent system, all processors will observe the writes to a given location to take place in the order shown. However, it is possible for a processing element to miss a write to the memory location. A given processing element reading the memory location could see the sequence 1, 3, 4, missing the update to the value 2. A system that implements these properties is said to be "coherent." Virtually all coherency protocols operate only to the granularity of the size of a cache block. That is to say, the coherency protocol controls the movement of and write permissions for data on a cache block basis and not separately for each individual memory location.

There are a number of protocols and techniques for achieving cache coherence that are known to those skilled in the art. At the heart of all these mechanisms for maintaining coherency is the requirement that the protocols allow only one processor to have a "permission" that allows a write to a given memory location (cache block) at any given point in time. As a consequence of this requirement, whenever a processing element attempts to write to a memory location, it must first inform all other processing elements of its desire to write the location and receive permission from all other processing elements to carry out the write. The key issue is that all other processors in the system must be informed of the write by the initiating processor before the write occurs. Furthermore, if a block is present in the L1 cache of a given processing unit, it is also present in the L2 and L3 caches of that processing unit. This property is known as inclusion and is well-known to those skilled in the art. Henceforth, it is assumed that the principle of inclusion applies to the caches related to the present invention.

To implement cache coherency in a system, the processors communicate over a common generalized interconnect (i.e., bus 20). The processors pass messages over the interconnect indicating their desire to read or write memory locations. When an operation is placed on the interconnect, all of the other processors "snoop" (monitor) this operation and decide if the state of their caches can allow the requested operation to proceed and, if so, under what conditions. There are several bus transactions that require snooping and follow-up action to honor the bus transactions and maintain memory coherency. The snooping operation is triggered by the receipt of a qualified snoop request, generated by the assertion of certain bus signals.

This communication is necessary because, in systems with caches, the most recent valid copy of a given block of memory may have moved from the system memory 16 to one or more of the caches in the system (as mentioned above). If a processor (say 12a) attempts to access a memory location not present within its cache hierarchy, the correct version of the block, which contains the actual (current) value for the memory location, may either be in the system memory 16 or in one of the caches in another processing unit, e.g. processing unit 12b. If the correct version is in one or more of the other caches in the system, it is necessary to obtain the correct value from the cache(s) in the system instead of system memory.

For example, consider a processor, say 12a, attempting to read a location in memory. It first polls its own L1 cache (24 or 26). If the block is not present in the L1 cache, the request is forwarded to the L2 cache (30). If the block is not present in the L2 cache, the request is forwarded on to lower cache levels, e.g., the L3 cache. If the block is not present in the lower-level caches, the request is then presented on the generalized interconnect (20) to be serviced. Once an operation has been placed on the generalized interconnect, all other lower-level caches snoop the operation and determine if the block is present in their caches. If a given processing unit has the block of data requested by the processing unit in its L1 cache, and that data is modified, by the principle of inclusion the L2 cache and any lower-level caches also have copies of the block (however, their copies are stale, since the copy in the processor's cache is modified). Therefore, when the lowest-level cache (e.g., L3) of the processing unit snoops the read operation, it will determine that the block requested is present and modified in a higher-level cache. When this occurs, the L3 cache places a message on the generalized interconnect informing the processing unit that it must "retry" its operation again at a later time, because the actual value of the memory location is in the L1 cache at the top of the memory hierarchy and must be retrieved to make it available to service the read request of the initiating processing unit.

Once the request from an initiating processing unit has been retried, the L3 cache begins a process to retrieve the modified data from the L1 cache and make it available at the L3 cache, main memory or both, depending on the exact details of the implementation which are not specifically relevant to this invention. To retrieve the block from the higher-level caches, the L3 cache sends messages through the inter-cache connections to the higher-level caches, requesting that the block be retrieved. These messages propagate up the processing unit hierarchy until they reach the L1 cache and cause the block to be moved down the hierarchy to the lowest level (L3 or main memory) to be able to service the request from the initiating processing unit.

The initiating processing unit eventually retries the read request on the generalized interconnect. At this point, however, the modified data has been retrieved from the L1 cache of a processing unit and the read request from the initiating processor will be satisfied. The scenario just described is commonly referred to as a "snoop push." A read request is snooped on the generalized interconnect which causes the processing unit to "push" the block to the bottom of the hierarchy to satisfy the read request made by the initiating processing unit.

The key point to note is that when a processor wishes to read or write a block, it must communicate that desire with the other processing units in the system in order to maintain cache coherence. To achieve this, the cache-coherence protocol associates with each block in each level of the cache hierarchy, a status indicator indicating the current "state" of the block. The state information is used to allow certain optimizations in the coherency protocol that reduce message traffic on the generalized interconnect and the inter-cache connections. As one example of this mechanism, when a processing unit executes a read, it receives a message indicating whether or not the read must be retired later. If the read operation is not retried, the message usually also includes information allowing the processing unit to determine if any other processing unit also has a still-active copy of the block (this is accomplished by having the other lowest-level caches give a "shared" or "not shared" indication for any read they do not retry). Therefore, a processing unit can determine whether any other processor in the system has a copy of the block. If no other processing unit has an active copy of the block, the reading processing unit marks the state of the block as "exclusive." If a block is marked exclusive, it is permissible to allow the processing unit to later write the block without first communicating with other processing units in the system because no other processing unit has a copy of the block. Therefore, it is possible for a processor to read or write a location without first communicating this intention onto the interconnection, but only where the coherency protocol has ensured that no other processor has an interest in the block.

The foregoing cache-coherency technique is implemented in a specific protocol referred to as "MESI," and illustrated in FIG. 2. In this protocol, a cache block can be in one of four states, "M" (Modified), "E" (Exclusive), "S" (Shared) or "I" (Invalid). Under the MESI protocol, each cache entry (e.g., a 32-byte sector) has two additional bits which indicate the state of the entry, out of the four possible states. Depending upon the initial state of the entry and the type of access sought by the requesting processor, the state may be changed, and a particular state is set for the entry in the requesting processor's cache. For example, when a sector is in the Modified state, the addressed sector is valid only in the cache having the modified sector, and the modified data has not been written back to system memory. When a sector is Exclusive, it is present only in the noted sector, and is consistent with system memory. If a sector is Shared, it is valid in that cache and in at least one other cache, all of the shared sectors being consistent with system memory. Finally, when a sector is Invalid, it indicates that the addressed sector is not resident in the cache. As seen in FIG. 2, if a sector is in any of the Modified, Shared or Invalid states, it can move between the states depending upon the particular bus transaction. While a sector in an Exclusive state can move to any other state, a sector can only become Exclusive if it is first Invalid.

A further improvement in accessing cache blocks can be achieved using the aforementioned cache-coherency protocol. This improvement, referred to as "intervention," allows a cache having control over a memory block to provide the data for that block directly to another cache requesting the data (for a read-type operation), in other words, bypassing the need to write the data to system memory and then have the requesting processor read it back again from memory. Intervention can only be performed by a cache having the data in a block whose state is Modified or Exclusive. In both of these states, there is only one cache block that has a valid copy of the data, so it is a simple matter to source the data over the bus 20 without the necessity of first writing it to system memory. The intervention procedure thus speeds up processing by avoiding the longer process of writing to and reading from system memory (which actually involves three bus operations and two data operations). This procedure not only results in better latency, but also increased usable bus bandwidth.

Prior-art protocols do not provide for intervention when data is held in Shared states by two or more caches because, generally, it is difficult to determine which cache would source the data. Intervention with Shared cache states can be provided if a system collects all of the Shared responses and then picks (e.g., arbitrarily) which cache should source the data, but this approach is generally no faster than getting the data from memory, and so it provides little benefit. It would, therefore, be desirable to devise a method of maintaining cache coherency which allowed for efficient intervention of data with Shared states.

SUMMARY OF THE INVENTION

It is therefore one object of the present invention to provide an improved method of maintaining cache coherency in a multi-processor computer system.

It is another object of the present invention to provide such a method that allows for improved intervention response when two or more caches hold the relevant instruction or data in a shared (i.e., valid) state.

It is yet another object of the present invention to provide such a method that can be further implemented in a multi-processor computer system with clustered processing units.

The foregoing objects are achieved in a method of maintaining cache coherency in a multi-processor computer system having a plurality of processing units grouped into at least two clusters, each processing unit cluster having at least two cache levels wherein a given one of a plurality of caches in a first cache level is used by only a single processing unit, and a given one of a plurality of caches in a second cache level is used by two or more processing units in the same cluster, the method generally comprising the steps of assigning a "recent" coherency state to a first cache line of a cache in the first cache level associated with a first processing unit in the first processing unit cluster, indicating that the first cache line contains a copy of a value that was most recently accessed by any processing unit in the first processing unit cluster, and similarly assigning the recent coherency state to a second cache line of a cache in the first cache level associated with a second processing unit in the second processing unit cluster, indicating that the second cache line contains a copy of the value that was most recently accessed by any processing unit in the second processing unit cluster. In other words, the recent state is applied to only one first-level cache in a given cluster, but can be applied to a plurality of such caches in different processing unit clusters. The value can be sourced to the second cache line from the first cache line. The recent coherency state can also be applied to a third cache line of a cache in the second cache level associated with the first processing unit cluster, i.e., the recent state can be applied at the second level as well as the first although, in a system having only two levels, the recent state would be applied to only one cache at the second level.

The recent state can be used in conjunction with the prior art "shared" coherency state, such as by sourcing the value to the first cache line from a third cache line of another cache in the first cache level associated with a third processing unit in the first processing unit cluster, and then assigning a shared coherency state to the third cache line indicating that the third cache line contains a copy of the value. Similarly, the value can be sourced from the second cache line to a third cache line of another cache in the first cache level associated with a third processing unit in the second processing unit cluster, so that the recent coherency state is assigned to the third cache line, indicating that the third cache line now contains a copy of a value that was most recently accessed by any processing unit in the second processing unit cluster, and assigning a shared coherency state to the second cache line indicating that the second cache line contains a valid copy of the value. Various other implementations are described.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF THE PREFERRED EMBODIMENT

Figure 1:
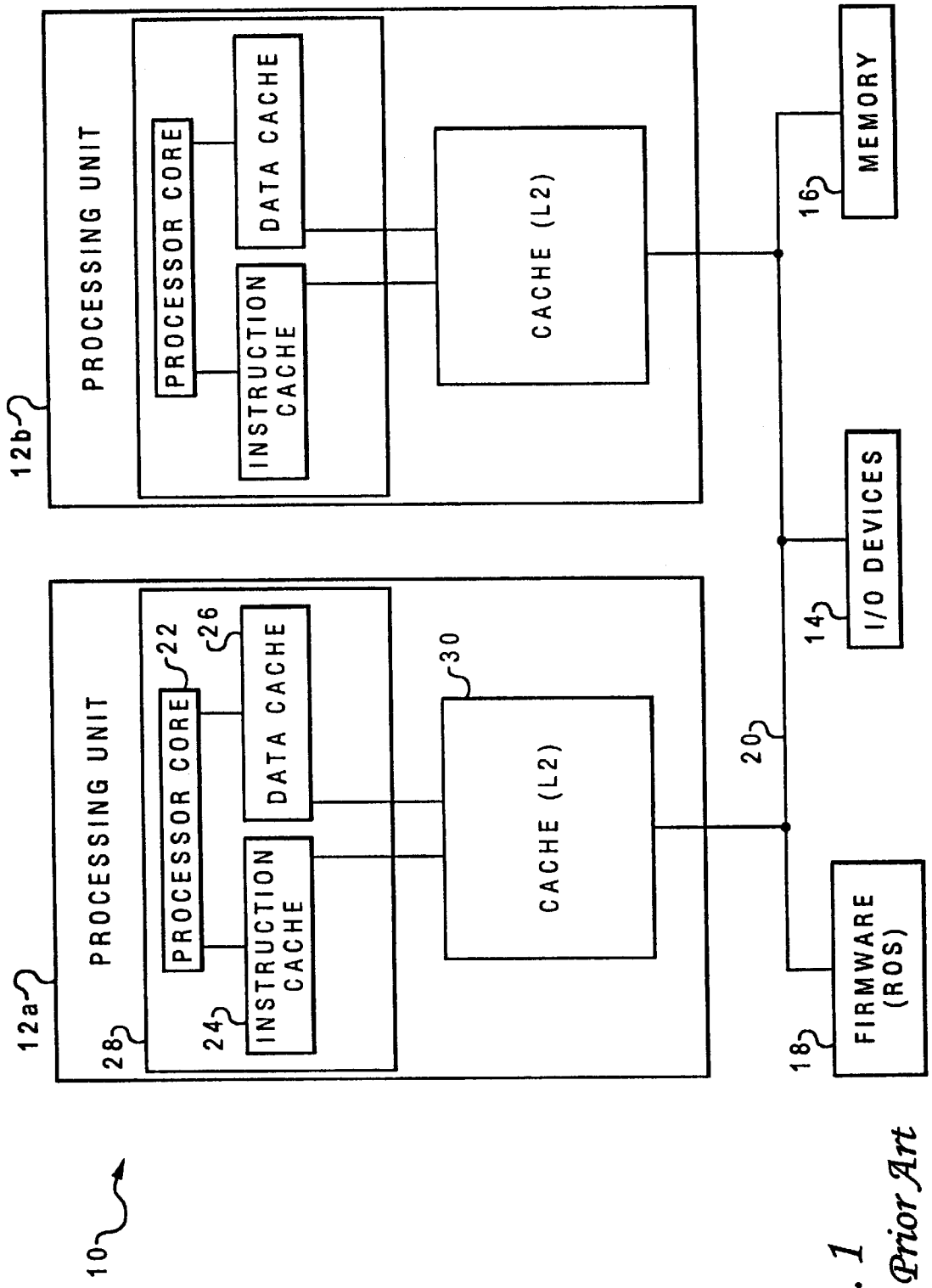
FIG. 1 is a block diagram of a prior-art multi-processor computer system.

The present invention is directed to a method of maintaining cache coherency in a multi-processor system, such as the system of FIG. 1, but the present invention could be applied to computer systems that are not necessarily conventional, i.e., they could include new hardware components not shown in FIG. 1, or have a novel interconnection architecture for existing components. Therefore, those skilled in the art will appreciate that the present invention is not limited to the generalized system shown in that figure.

Figure 3:
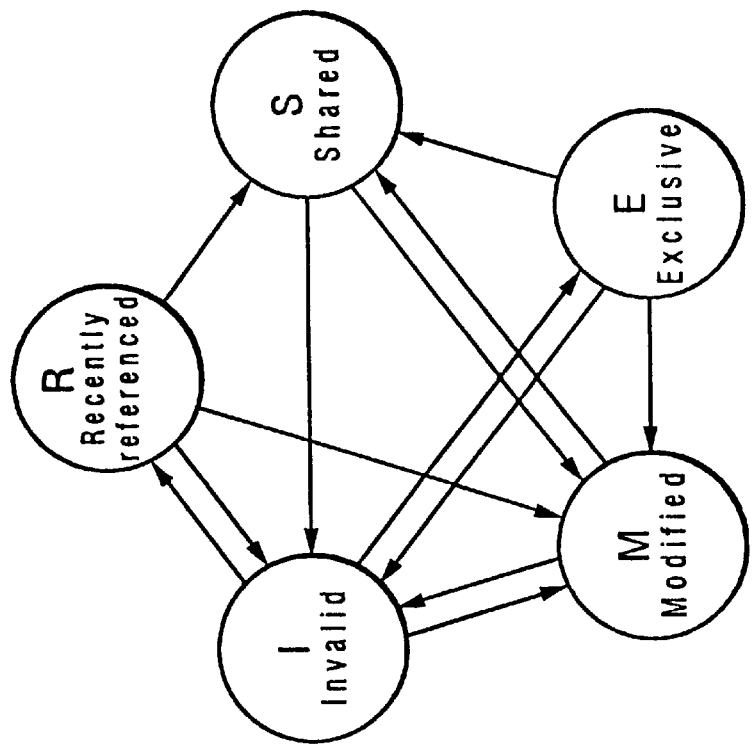
FIG. 3 is a state diagram depicting the cache-coherency protocol of the present invention.
Figure 2:
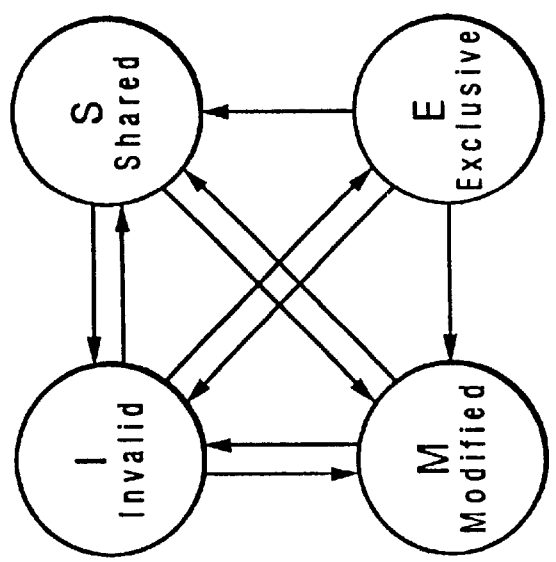
FIG. 2 is a state diagram depicting a prior-art cache-coherency protocol (MESI)

With reference now to FIG. 3, there is depicted a state diagram of one embodiment of the cache-coherency protocol of the present invention. This protocol is similar to the prior-art MESI protocol of FIG. 2, in that it includes the same four states (Modified, Exclusive, Shared and Invalid), but it also includes a new "R" state (Recent), for providing an indication of the most recently referenced block that would otherwise have a shared indication. In other words, when two or more caches hold valid copies of data, all of them will be in the Shared state except for the cache which most recently accessed the data, and that cache will be in the Recent state. Since there are now five possible total states, each cache entry requires a three-bit field (instead of a two-bit field as in the prior art) to identify which state the entry possesses.

This new protocol is referred to herein as the "R-MESI" protocol. Under this protocol, a new coherency response is also provided, that of Shared-Intervention, as explained further below. As with the prior-art protocol, the four M-E-S-I states may change based on the initial state of the entry and the type of access sought by the requesting processor. The manner in which these four states change is generally identical to the prior-art MESI protocol, with the exceptions noted below.

Table 1 shows the master cache state transitions for read-type operations, where a "miss" occurs:

TABLE 1

| | Bus Operation | Master State | Coherency Response |
|---|---|---|---|
| 1 | Read | I → R | ShrI, Shr, or Mod |
| 2 | RWITM | I → E | ShrI, Shr, or Null |
| 3 | Read | I → E | Null |
| 4 | RWITM | I → M | Mod |

The Recent state is entered on a "Read miss" bus operation (the first row of Table 1) if the coherency response is Modified (Mod), Shared (Shr), or Shared-Intervention (ShrI); if the response is Modified on a "Read miss" operation, the modified cache will send the data to memory also, so it is no longer Modified. If there is no coherency response (Null) on a "Read miss" operation (the third row of Table 1), then the Exclusive state is entered as with the prior-art MESI protocol. On an "RWITM miss" operation (RWITM is an abbreviation for Read With Intent To Modify), the Exclusive state is entered if the coherency response is Null, Shr or ShrI (the second row of Table 1), and the Modified state is entered if the coherency response is Mod (the fourth row of Table 1).

Table 2 shows an example of how the bus transactions influence the cache when acting as a snooper, for read-type operations (read hits):

TABLE 2

| | Bus Operation | Snooper State | Coherency Response |
|---|---|---|---|
| 1 | Read-Burst | R → S | ShrI |
| 2 | Read-Burst | E → S | ShrI |
| 3 | Read-Burst | M → S | Mod |
| 4 | RWITM | E or R → I | ShrI |
| 5 | RWITM | M → I | Mod |

For either an Exclusive or Recent beginning state (the first, second, and fourth rows of Table 2), the cache will transmit a Shared-Intervention coherency response, meaning that it will source its copy of the data via intervention directly to the requesting processor, without involvement from the system memory. Whenever data is so sourced, the next state becomes Shared for a "Read hit" operation (the first and second rows of Table 2) or Invalid for an "RWITM hit" operation (the fourth row of Table 2). In those cases where the beginning state is Modified (the third and fifth rows of Table 2), the coherency response will be Modified; intervention still occurs. If the bus operation was an "RWITM," the data is transferred from cache to cache, but if the bus operation was a read, the data is sent both to the cache and to memory.

As noted above, for those states and operations not shown in Tables 1 and 2, transitions and coherency responses are performed in accordance with the prior-art MESI protocol with one qualification, namely, a cache entry can have an "R" state which is subjected to a write operation, and that entry will undergo a transition to a Modified state in a manner similar to that occurring when a Shared entry is subjected to a write operation. The following points might further be noted with respect to the R-MESI protocol: an entry can never go from Invalid to Shared (it would go to Recent instead); an entry can never go from Exclusive to Recent (it would go to Shared); an entry can never go from Recent to Exclusive (just as a Shared entry cannot go to Exclusive); and an entry can never go from Modified to Recent (it would go to Shared, while entry in the cache of the requesting processor would go to Recent).

With this new R-MESI protocol, the ownership of a block migrates to the last cache to read the data, which has the added benefit of staying most recently used and thereby lessening the chance of deallocation if a least recently used (LRU) cache replacement mechanism is employed. The "R" cache state can also be advantageously used for other applications, such as an intelligent input/output (I/O) controller interrupting the processor/cache which has most recently read a cached I/O status location, since this processor/cache would be most likely to have cached the I/O device driver code and, therefore, could execute the code faster than in another processor that needs to fetch the code into its cache.

Figure 4:
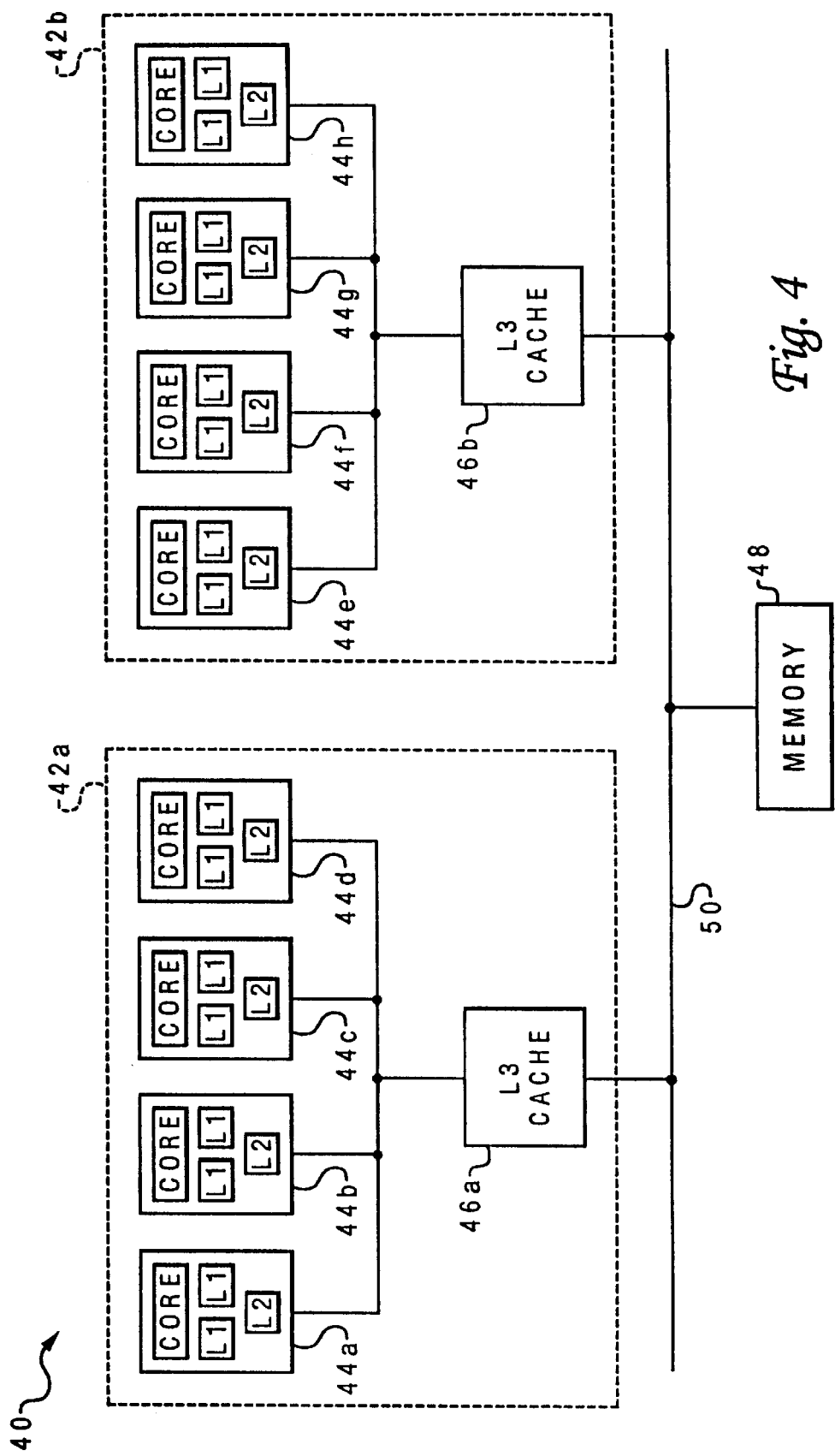
FIG. 4 is a block diagram of multi-processor computer system having a multilevel cache architecture which can be adapted to utilize the recent coherency state of the present invention on both a global scale and a local (CPU cluster) scale.

The foregoing description of the invention is generally applicable to a cache architecture of any level, e.g., L2, L3, etc., but in the case of multiple level caches, the invention can be further advantageously applied with a slightly different model. Referring to FIG. 4, a multi-processor computer system 40 is shown which includes two CPU clusters 42a and 42b. CPU cluster 42a has four CPU's 44a, 44b, 44c, and 44d, each having a processor core with on-board (L1) instruction and data caches, and an L2 cache.

The L2 caches of these four CPUs 44a, 44b, 44c, and 44d are connected to a shared L3 cache 46a, which is connected to the system memory (RAM) 48 via the generalized interconnect, or bus, 50. CPU cluster 42b similarly has four CPU's 44e, 44f, 44g, and 44h, each also having a processor core with on-board (L1) instruction and data caches, and an L2 cache. The L2 caches of these four CPUs 44e, 44f, 44g, and 44h are connected to another shared L3 cache 46b, which is again connected to memory 48 via bus, 50. In a hierarchical variation of the R-MESI protocol, up to three corresponding cache lines can be found in the Recent state: one cache line among the L2 caches of CPUs 44a, 44b, 44c, and 44d; one cache line among the L2 caches of CPUs 44e, 44f, 44g, and 44h; and one cache line between the two L3 caches 46a and 46b.

Consider the following example, wherein all of the corresponding cache lines in CPUs 44a–44h begin in the Invalid state. Processor 44a executes an read operation, and so its cache line (L2) goes from an Invalid state to a Recent state; the corresponding cache line in L3 cache 46a also goes from Invalid to Recent. Thereafter, processor 44b requests a read of the cache line; processor 44a intervenes and its cache line (L2) switches to the Shared state, while the cache line (L2) of processor 44b goes from the Invalid state to the Recent state. The cache line in L3 cache 46a remains Recent. Later, processor 44e requests a read of the cache line; processor 44b intervenes, but its cache line (L2) remains in the Recent state, since it is in a different CPU cluster from processor 44e. The cache line (L2) in processor 44e nonetheless switches from the Invalid state to the Recent state. Also, since the intervened value has passed through both L3 caches, the cache line in L3 cache 46a switches from Recent to Shared, and the cache line in L3 cache 46b switches from Invalid to Recent. Thereafter, if processor 44f requests a read of the cache line, it can be sourced by the cache line (L2) of processor 44e. In such a case, the cache line (L2) of processor 44e switches from the Recent state to the Shared state, and the cache line (L2) of processor 44f switches from the Invalid state to the Recent state. These steps are illustrated in Table 3:

TABLE 3

|  | L2$_{44a}$ | L2$_{44b}$ | L2$_{44e}$ | L2$_{44f}$ | L3$_{46a}$ | L3$_{46b}$ |
|---|---|---|---|---|---|---|
| Initial States | I | I | I | I | I | I |
| P$_{44a}$ Read | R | I | I | I | R | I |
| P$_{44b}$ Read | S | R | I | I | R | I |
| P$_{44e}$ Read | S | R | R | I | S | R |
| P$_{44f}$ Read | S | R | S | R | S | R |

In the last row of Table 3, each CPU cluster has one cache line in the "R" state, and one of the L3 caches has a line in the "R" state as well. This condition allows the value to be sourced at the L2 level from a local processor (i.e., one within the same cluster as the requesting processor), to further enhance performance. So if processor 44c thereafter requests a read of the cache line, this request will be filled by the cache line (L2) of processor 44b, but if processor 44g thereafter requests a read of the cache line, that request would be filled by the cache line (L2) of processor 44f; both operations would occur at the L2 level, without any action by L3 caches 46a and 46b. If more than two CPU clusters were provided, then the "R" cache line could similarly migrate among the additional L3 caches. As those skilled in the art will appreciate, this concept can be extended to cache architectures having even more than three cache levels (L1, L2, L3).

By providing intervention for shared data (that is, data which are validly present in more than one cache) memory latency is significantly improved. In one evaluation of the R-MESI protocol, performance increased according to an industry standard benchmark from 5300 TPM$_c$ to 7500 TPM$_c$ (transactions per minute), when compared to the prior-art MESI protocol. Generally, the present invention frees up the memory controller, and demand on memory bandwidth is lessened.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. For example, a further variation of the R-MESI protocol used with global/local caches could be implemented to allow for posted "DClaim" operations (as described in U.S. patent application Ser. No. 09/024,587, now pending, <attorney docket no. AT-9-97-419>), by providing a special "R" state to signify that only the cache having this special state is responsible for posting the DClaim operation. It is therefore contemplated that such modifications can be made without departing from the spirit or scope of the present invention as defined in the appended claims.

We claim:

1. A method of maintaining cache coherency in a multi-processor computer system having a plurality of processing units grouped into at least two clusters, each processing unit cluster having at least two cache levels wherein a given one of a plurality of caches in the first cache level is used by only a single processing unit, and a given one of a plurality of caches in the second cache level is used by two or more processing units in the same cluster, the method comprising the steps of:

assigning a recent coherency state to a first cache line of a cache in the first cache level associated with a first processing unit in the first processing unit cluster, indicating that the first cache line contains a copy of a value that was most recently accessed by any processing unit in the first processing unit cluster;

assigning the recent coherency state to a second cache line of a cache in the first cache level associated with a second processing unit in the second processing unit cluster, indicating that the second cache line contains a copy of the value that was most recently accessed by any processing unit in the second processing unit cluster;

sourcing the value to the first cache line from a third cache line of another cache in the first cache level associated with a third processing unit in the first processing unit cluster, prior to said steps of assigning the recent coherency state; and assigning a shared coherency state to the third cache line indicating that the third cache line contains a copy of the value.

2. The method of claim 1 further comprising the step of sourcing the value to the second cache line from the first cache line after said step of assigning the recent coherency state to the first cache line.

3. A computer system comprising:

a system memory device;

a bus connected to said system memory device;

a first plurality of processing units each having a cache for storing values from said system memory device, said first plurality of processing units being grouped into a first processing unit cluster;

a second plurality of processing units each having a cache for storing values from said system memory device, said second plurality of processing units being grouped into a second processing unit cluster;

a first cluster cache connected to each said cache of said first plurality of processing units, and to said bus;

a second cluster cache connected to each said cache of said second plurality of processing units, and to said bus; and cache coherency means for assigning a recent coherency state to a first cache line of a cache associated with a first processing unit in the first processing unit cluster, to indicate that the first cache line contains a copy of a value that was most recently accessed by any processing unit in the first processing unit cluster, and for assigning the recent coherency state to a second cache line of a cache associated with a second processing unit in the second processing unit cluster, to indicate that the second cache line contains a copy of the value that was most recently accessed by any processing unit in the second processing unit cluster, said cache coherency means further including means for sourcing the value to the first cache line from a third cache line of another cache associated with a third processing unit in the first processing unit cluster, prior to said assigning of the recent coherency state, and for assigning a shared coherency state to the third cache line to indicate that the third cache line contains a copy of the value.

4. The computer system of claim 3 wherein said cache coherency means includes means for sourcing the value to the second cache line from the first cache line after said assigning of the recent coherency state to the first cache line and in response to a read request from said second processing unit.

5. A method of maintaining cache coherency in a multi-processor computer system having a plurality of processing units grouped into at least two clusters, each processing unit cluster having at least two cache levels wherein a given one of a plurality of caches in the first cache level is used by only a single processing unit, and a given one of a plurality of caches in the second cache level is used by two or more processing units in the same cluster, the method comprising the steps of:

assigning a recent coherency state to a first cache line of a cache in the first cache level associated with a first processing unit in the first processing unit cluster, indicating that the first cache line contains a copy of a value that was most recently accessed by any processing unit in the first processing unit cluster;

assigning the recent coherency state to a second cache line of a cache in the first cache level associated with a second processing unit in the second processing unit cluster, indicating that the second cache line contains a copy of the value that was most recently accessed by any processing unit in the second processing unit cluster;

sourcing the value from the second cache line to a third cache line of another cache in the first cache level associated with a third processing unit in the second processing unit cluster;

assigning the recent coherency state to the third cache line, indicating that the third cache line contains a copy of a value that was most recently accessed by any processing unit in the second processing unit cluster; and assigning a shared coherency state to the second cache line indicating that the second cache line contains a copy of the value, after said sourcing step.

6. A computer system comprising:

a system memory device;

a bus connected to said system memory device;

a first plurality of processing units each having a cache for storing values from said system memory device, said first plurality of processing units being grouped into a first processing unit cluster;

a second plurality of processing units each having a cache for storing values from said system memory device, said second plurality of processing units being grouped into a second processing unit cluster;

a first cluster cache connected to each said cache of said first plurality of processing units, and to said bus;

a second cluster cache connected to each said cache of said second plurality of processing units, and to said bus; and cache coherency means for assigning a recent coherency state to a first cache line of a cache associated with a first processing unit in the first processing unit cluster, to indicate that the first cache line contains a copy of a value that was most recently accessed by any processing unit in the first processing unit cluster, and for assigning the recent coherency state to a second cache line of a cache associated with a second processing unit in the second processing unit cluster, to indicate that the second cache line contains a copy of the value that was most recently accessed by any processing unit in the second processing unit cluster, said cache coherency means further including means for (i) sourcing the value from the second cache line to a third cache line of another cache associated with a third processing unit in the second processing unit cluster, (ii) assigning the recent coherency state to the third cache line, to indicate that the third cache line contains a copy of a value that was most recently accessed by any processing unit in the second processing unit cluster and (iii) assigning a shared coherency state to the second cache line to indicate that the second cache line contains a copy of the value, after said sourcing of the value.

* * * * *